Oct. 10, 1944.     G. LOWKRANTZ     2,359,866
VARIABLE SPEED DRIVE APPARATUS
Filed March 19, 1942     3 Sheets-Sheet 1

GUNNE LOWKRANTZ
*INVENTOR.*

BY Leech & Radue

ATTORNEYS.

Patented Oct. 10, 1944

2,359,866

UNITED STATES PATENT OFFICE 2,359,866

VARIABLE SPEED DRIVE APPARATUS

Gunne Lowkrantz, Binghamton, N. Y., assignor to Link Aviation Devices, Inc., Binghamton, N. Y., a corporation of New York Application March 19, 1942, Serial No. 435,437

12 Claims. (Cl. 35—12)

The present invention pertains to a variable speed drive apparatus intended particularly for use in varying the speed of movement of a recorder or course indicator used in conjunction with a grounded aircraft trainer.

As such, the present apparatus represents a further embodiment of the variable speed drive apparatus disclosed in application Serial No. 406,056, filed August 8, 1941, in the name of Gunne Lowkrantz and Karl A. Kail.

For a full disclosure of this type of trainer, commonly referred to as a Link trainer, see Edwin A. Link, Jr., Patents Nos. 1,825,462 and 2,099,857. The recorder, the speed of which the apparatus of the present invention is intended to vary accurately and conveniently, is described in Edwin A. Link, Jr., Patent No. 2,179,663. The aircraft trainer is mounted for rotation about a fixed axis in response to operation of its controls; and the recorder is for the purpose of automatically plotting on a chart remote from the trainer every turning movement of the trainer and the linear movement of the recorder in whatever direction it is turned. Changes in assumed forward speed of the trainer, simulating the flight of an aeroplane through the air, are manifested in the proportional linear movement of this course recorder by use of the means described in the above application.

In the application previously mentioned, a make-and-break device is used to control the linear speed of the recorder over a chart by supplying current intermittently to the propelling motors of the recorder. That is to say, the circuit of these motors is broken regularly and more or less frequently according to the aircraft speed which is to be proportionately reproduced. Consequently, the recorder moves over the chart in a continuous path characterized by small increments of starting and stopping. While such operation has been found satisfactory for most purposes, any considerable enlargement of the plot or "track" of the recorder movement will display jerkiness and lack of smoothness. This is particularly objectionable where the recorder "track" is greatly enlarged and projected for more convenient observation of the course of the trainer.

One of the principal purposes of this invention is to provide a variable speed drive which can be accurately controlled at all times and which will deliver to the propelling motors of the recorder electrical energy of such a nature that the recorder will be moved continuously and smoothly at variable linear speeds always proportionate to that assumed for the trainer.

Another object of the invention lies in the provision of means for coupling such a variable speed apparatus to an output shaft from the trainer, the movement of which corresponds to resultant ground speed, and to an electrical recorder adapted to plot the simulated flight of the trainer.

More specifically, novel provision has been made for utilizing the familiar friction disc and driven wheel type of speed varying apparatus to produce the required control of electric recorder movement.

In general, the apparatus to be described comprises a friction driving disc adapted to be rotated at constant speed, a driven wheel having its periphery engaged by the friction disc and mounted on a shaft connected to the rotor of a self-synchronous motor, and a carriage for supporting the driven wheel shaft and the self-synchronous motor, arranged for reciprocating movement relative to said friction disc to vary the speed of said self-synchronous motor in response to changes in resultant ground speed output of the trainer.

Other novel features of improvement contributing to simplicity of construction and preciseness in operation of such a variable speed drive apparatus will appear from a reading of the following detailed description of a preferred embodiment taken with the accompanying drawings, in which Fig. 1 is a general view showing a Link trainer, the recorder, and the general relation thereto of the apparatus of this invention.

Figure 1:
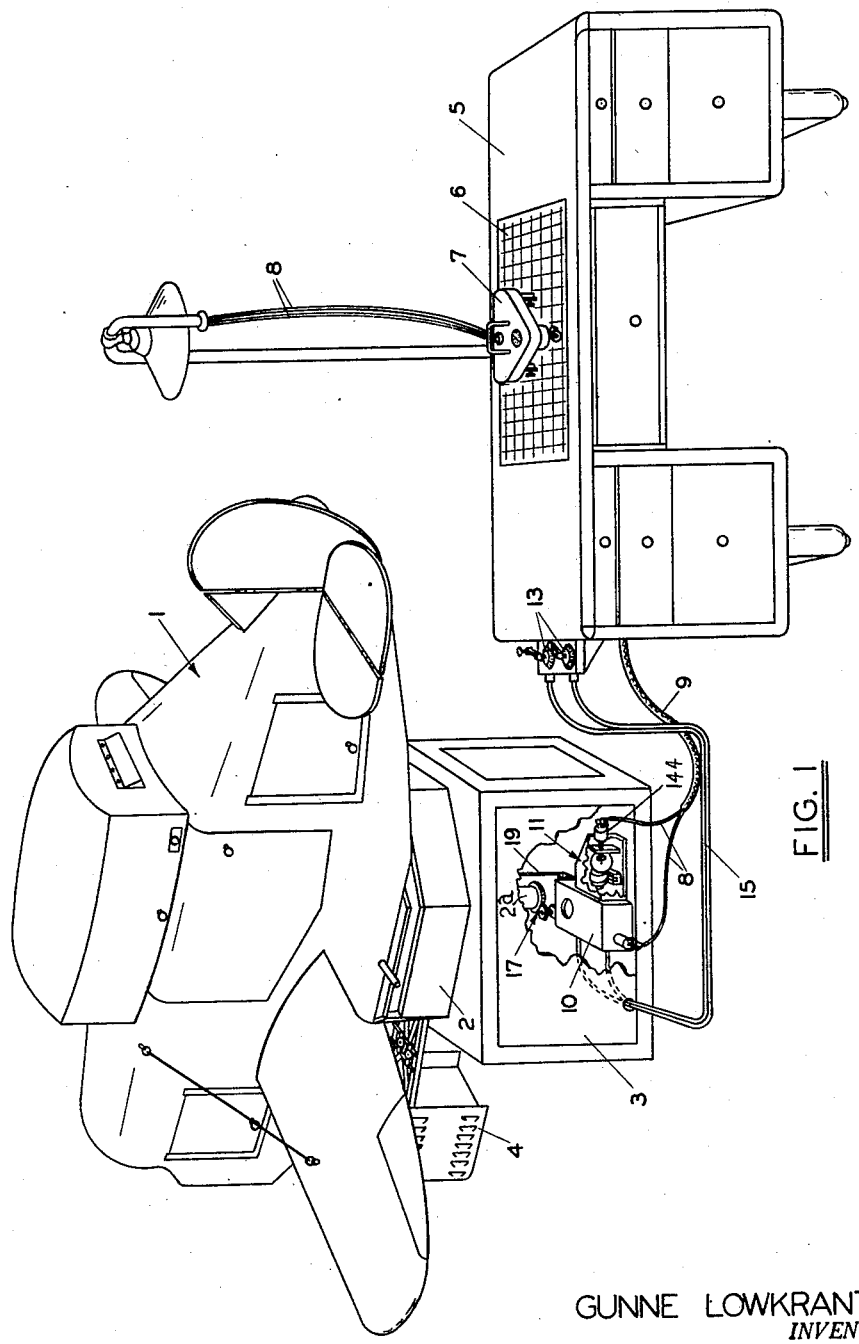

Reference is made to Fig. 1 which discloses an aviation trainer of the type shown in United States Patents Nos. 1,825,462 and 2,099,857. From this figure it will be seen that there is provided a fuselage 1 which is mounted upon a universal joint (not shown) between the bottom of the fuselage and octagon 2. Octagon 2, by means of a central shaft 2a is rotatably positioned above the stationary base 3. Also, within the fuselage but not shown are simulated rudder pedals and a simulated control column. Means are provided whereby the student in the trainer, by an actuation of the rudder pedals, may energize the turning motor 4 to cause the fuselage 1 to turn about its vertical axis indefinitely in either direction; and also the student may, by a movement of the control column cause the fuselage 1 to tilt laterally in simulation of the banking of a plane in actual flight or to pitch and climb longitudinally in simulation of the climbing and diving of a plane in actual flight.

Also shown in Fig. 1 is the instructor's desk 5 upon which is mounted a map or chart 6 over which runs a recorder 7 such as is disclosed in United States Patent 2,179,663. As previously stated, the purpose of the recorder is to automatically record upon the chart 6 every turning movement of the trainer as well as the assumed forward movement of the trainer. The recorder is electrically connected to the trainer by means of cable 8 which, it will be seen, runs from the base of the trainer 3 to the recorder 7. Positioned within the base of the trainer is the wind drift instrument 10 of the type disclosed in the above mentioned copending application, and closely associated with the wind drift instrument is the mechanism of this invention which is designated generally by the numeral 11.

In Fig. 1 it will be seen that the wind drift instrument 10 and the mechanism of the instant invention 11 are connected to the recorder 7 by wires 8 contained in cable 9. Two cranks 13 are connected to the wind drift instrument 10 by means of flexible shaftings 15 in order that assumed wind speed and direction may be introduced into the instrument. Trainer heading is introduced into the wind drift instrument by shaft 2a and gears 17 while trainer air speed is introduced by means of cable 19. For a more complete explanation of the construction, functioning and purpose of the wind drift instrument reference is made to the copending application Serial Number 406,056.

The winddrift instrument 10 includes a differential 12 delivering its output to a pinion gear 14. The output or rotational position of pinion gear 14 corresponds to the simulated air speed of the trainer qualified by the effect of simulated wind conditions, which resultant is commonly referred to as ground speed.

An upturned rack bar 16 in mesh with pinion gear 14 has an underlying roller support 18, and lateral supporting means comprising a guide rail 20 oppositely arranged and parallel thereto and a slider 22 moving on the guide rail. The slider 22 has a pin or screw connection 24 with one end of rack bar 16 while an intermediate rod 26 is connected rigidly and at right angles to the slider 22 and extends to a similar slider (not shown) also mounted on the guide rail 20.

A horizontal connecting rod 28 has its left end threaded into a socketed clevis 30 joined to the adjacent end of rack bar 16 by a connecting pin 32. At its other end the connecting rod 28 is rigidly secured to a reciprocable carriage indicated generally as 34.

The housing of instrument 10 is provided with a base extension 36 on which a suitable and conventional constant speed, electric driving motor 38 is supported by a base 40 which is bolted in place. It will be observed that the rotational axis of the electric driving motor 38 extends parallel to the reciprocating connecting rod 28 and that the right end of this motor carries an angular speed reduction, gear drive 42 having a horizontal output shaft 44 perpendicular to the reciprocating path of carriage 34. A flanged and socketed drive disc 46 is secured to the outer end of the motor output shaft 44 and provided with a friction surface 48 arranged to engage the periphery of a small driven wheel 50 connected to carriage 34 for reciprocating movement over the face of the disc. The axis of rotation of the driven wheel 50 extends parallel to the plane of the driving face of disc 46 and intersects the axis line of shaft 44.

The reciprocable carriage 34 moves along a rail 52 comprising a vertically arranged flat bar of rectangular cross-section extending from the distant half of drive disc 46 nearly to the end of base extension 36 well beyond the periphery of said disc. A pair of standards 54 and 56 bolted to the base extension 36 support the rail 52 in a position parallel to and in front of the driving face of disc 46, and approximately on a level with the upper extremity of that disc.

Referring more in detail to the carriage 34, it will be noted that this member is slotted at spaced intervals to receive vertical and lateral antifriction supporting means.

Figure 2:
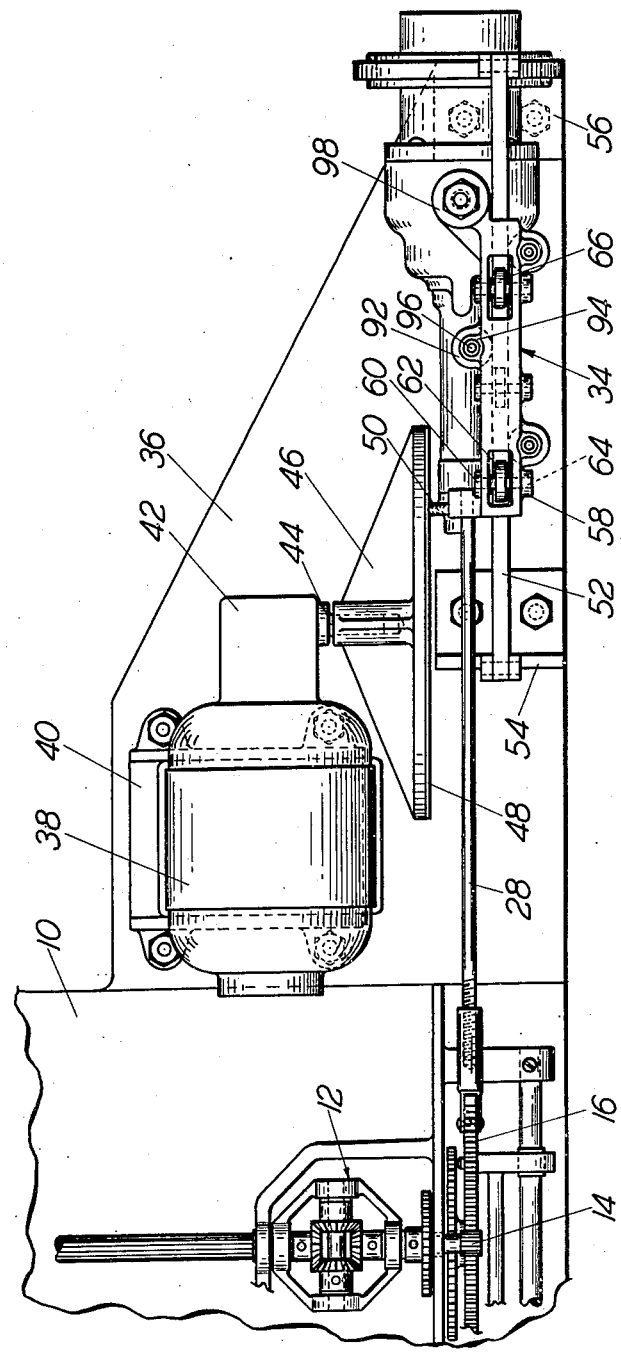
Fig. 2 is a top plan view of the complete apparatus.

At the left end of carriage 34 as seen in Fig. 2, a pair of upstanding spaced lugs 58 and 60 receive a roller 62 carried on a horizontal shaft 64 extending between said lugs and bearing on the upper face of rail 52. A similarly mounted and supported roller 66 is arranged adjacent the other end of carriage 34 for like engagement with the upper face of the rail 52. A lower roller 68 acting in opposition to upper rollers 62 and 66 is disposed between a spaced pair of depending lugs, only one of which, 70, is shown, and mounted for rotation about the horizontal axis of a shaft or axle 74 carried by said lugs. These upper and lower rollers are so constructed as to guide the carriage 34 accurately and without appreciable tilting in a vertical plane.

An outer pair of horizontal rollers 76 and 78 are mounted on carriage 34 slightly out of alignment with the vertically disposed rollers 62 and 66 respectively. Roller 76 enters the slotted carriage 34 between a parallel pair of horizontal lugs 80 and 82 to which it is secured by a vertical axle or shaft 84. In like manner, outer horizontal roller 78 is supported and maintained by a pair of lugs 86, 88, and a vertical shaft 90. As is apparent from Fig. 2, the horizontal rollers 76 and 78 are arranged to engage the front lateral face of the rail 52.

Sufficient lateral restraint and guidance for the carriage 34 is afforded by an intermediately disposed horizontal roller 92 which bears upon the inner, lateral face of the rail 52. The roller 92 is supported between a horizontal pair of lugs of which only the upper lug 94 is shown. A vertical axle 96 extends between these lugs and carries the roller 92.

Figure 3:
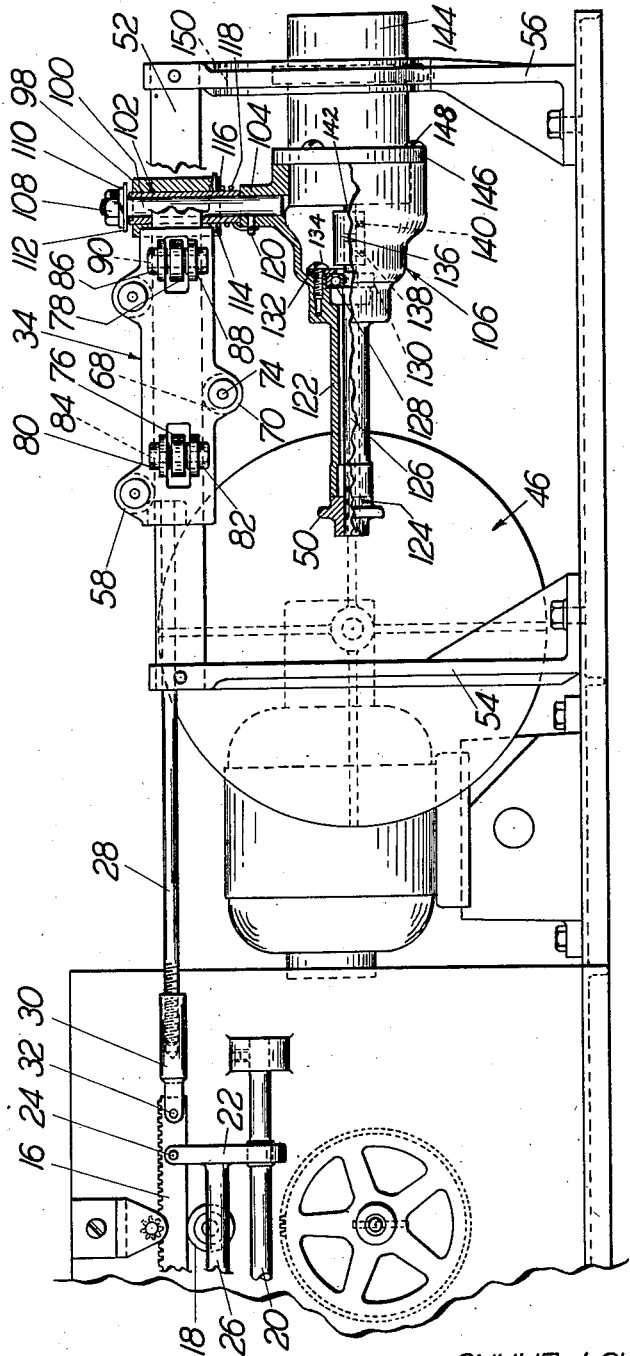
Fig. 3 is a side elevation of the apparatus shown in Fig. 2.

Rearwardly and at the right end of carriage 34 an integral bearing sleeve 98 extends vertically for the purpose of receiving a spindle 100 provided with a bearing bushing 102. The spindle 100 projects below sleeve 98 and is received within a bored boss 104 of a coupling housing 106 extending generally parallel to the carriage 34. At its upper end the spindle 100 projects above the sleeve 98 and bushing 102 and threadedly carries a nut 108 acting against a lock washer 110 to clamp a larger bearing washer 112 in place. In Fig. 3, it will be particularly noted that the lower end of sleeve 98 which extends below the carriage 34 has a short counterbore 114 provided with a vertical slot 116 receiving the upper end of a torsion spring 118 encircling the projecting portion of bushing 102. A horizontally extending pin 120, which may also be used to secure the spindle 100 within the boss 104 of housing 106, provides an anchor for the lower end of the torsion spring 118. The arrangement of the resilient means or spring 118 is such as to rotate the coupling housing 106 rearwardly of the carriage 34 toward the face of drive disc 46.

A cylindrical extension 122 extends in the direction of disc 46 and provides at its outer end a bearing for an adjacent hub 124 formed on the small driven wheel 50. The wheel 50 has also a horizontal shaft 126 which extends loosely within the cylindrical extension 122 and is supported near its other end by a ball bearing assembly 128 mounted in a shouldered recess 130 of the coupling housing 106. A retaining washer 132 is arranged to hold the ball bearing 128 in place when clamped down by screws 134. As appears in Fig. 3, the housing 106 is open at its right end to give access to the ball bearing 128 and washer 132.

A rigid shaft coupling 136 extends over the free end of shaft 126 and is secured thereto by a set screw 138, another set screw 140 at the other end of the shaft coupling 136 being used for connection with the input or rotor shaft 142 of a self-synchronous motor unit 144.

The self-synchronous motor 144 extends an appreciable distance within the open end of coupling housing 106 and has a flange collar 146 providing an abutment stop engaging the housing 106, and detachably secured thereto by a series of peripheral screws 148. It will be noted that the standard 56 supporting the right or outer end of rail 52 is formed with a suitable opening 150 through which the exposed portion of the motor unit 144 can extend and reciprocate in response to shifting of the driven wheel 50 for recorder speed variation.

The term "motor" as applied to the self-synchronous magnetoelectric device 144 requires some amplification. When two or more self-synchronous motors are electrically connected and energized by a suitable source of alternating current, their rotors will always remain in the same angular position with respect to their stators. Consequently, if the rotor of one motor is caused to revolve by application of an outside force, the rotor of each other motor to which it is linked will follow automatically. Only the electrically driven self-synchronous units are "motors" in the strict sense of that word, but both the driving and driven units of a self-synchronous system are commonly referred to as motors. It will be apparent that the driving unit 144 of this invention could readily be replaced by a small electric generator where a selectively variable voltage source is desired, and a self-synchronous system is not involved.

The self-synchronous motor 144 carries flexible leads such as 8 in Fig. 1 leading to the propelling motor or motors of the recorder 7, described in detail in U. S. Patent 2,179,663. In this manner, these propelling motors, which for the purpose of use with this invention must be of the self-synchronous type, will drive the recorder at a speed which is proportional to the speed of rotation imparted to the rotor of the self-synchronous motor 144 by the driven wheel 50. Consequently, reciprocation of the carriage 34 in response to shifting of the rack 16 will vary the linear speed of the recorder from zero to a maximum, when the wheel 50 is at the center and the periphery respectively, of the large disc 46 constantly driven by motor 38.

In the manner which has been described in detail, there has been provided a variable speed drive apparatus of simple construction which will accurately convert shaft rotation representative of resultant ground speed, into uniform, proportionate movement of a recorder which is electrically driven. Among the particularly advantageous features of this invention are the closely guiding carriage support 34 for the driven wheel 50 of the speed varying device, and the means for yieldingly urging that driven wheel against the face of the vertical driving wheel 46 with substantially constant pressure and the avoidance of inaccuracy due to slipping.

While the apparatus of this invention has been described in connection with one specific application, it will be apparent that it has wider utility, and also that changes may be made in the details of its construction without departing from the scope of the appended claims.

Having thus described the invention, what is claimed as new and desired to be secured by Letters Patent of the United States is:

1. The combination of a grounded aviation trainer; means for positioning an element in accordance with the simulated ground speed of said trainer; a driving disc rotated at a constant speed; a second disc positioned with respect to said first-mentioned disc to be driven thereby, said second disc being connected to said element to be positioned radially of said driving disc in accordance with the position of said element; a self-synchronous transmitter having its rotor coupled to said driven disc for rotation therewith, whereby the rotation of said rotor is continuous and its speed proportional to the simulated ground speed of said trainer.

2. The combination of a grounded aviation trainer; means for positioning an element in accordance with the simulated ground speed of said trainer; a driving disc rotated at a constant speed; a second disc positioned with respect to said first-mentioned disc to be driven thereby, said second disc being connected to said element to be positioned radially of said driving disc in accordance with the position of said element; a magneto-electric device having its rotor coupled to said driven disc for rotation therewith, whereby the rotation of said rotor is continuous and its speed proportional to the simulated ground speed of said trainer.

3. The combination of a grounded aviation trainer; means for positioning an element in accordance with the simulated ground speed of said trainer; a driving disc rotated at a constant speed; a second disc positioned with respect to said first-mentioned disc to be driven thereby, said second disc being connected to said element to be positioned radially of said driving disc in accordance with the position of said element; a self-synchronous transmitter having its rotor coupled to said driven disc for rotation therewith, said transmitter being connected to a self-synchronous receiver driving a course indicator, whereby the forward movement of said course indicator is continuous and proportional to the simulated ground speed of said trainer.

4. The combination of a grounded aviation trainer; means for positioning an element in accordance with the simulated ground speed of said trainer; a driving disc rotated at constant speed; a second disc positioned with respect to said first-mentioned disc to be driven thereby, said second disc being connected to said element to be positioned radially of said driving disc in accordance with the position of said element; a magneto-electric device having its rotor coupled to said driven disc for rotation therewith, said magneto-electric device being connected to a receiver responsive to its output and driving a course indicator, whereby the forward movement of said course indicator is continuous and proportional to the simulated ground speed of said trainer.

5. The combination of a grounded aviation trainer comprising a first element which it is desired to move at a rate of speed dependent upon the assumed conditions of flight of said trainer; means for positioning a second element in accordance with the simulated conditions of flight of said trainer; a driving disc rotated at a constant rate of speed; a second disc positioned with respect to said first-mentioned disc to be driven thereby; means for positioning one of said discs relative to the center of the other of said discs in accordance with the position of said second element, whereby the speed of rotation of said second-mentioned disc is dependent upon the position of said second-mentioned element; and means connecting said second disc and said first-mentioned element whereby said first-mentioned element is moved at a rate dependent upon the assumed conditions of flight of said trainer.

6. The combination of a grounded aviation trainer comprising a first element which it is desired to move at a rate of speed dependent upon the assumed ground speed of said trainer; means for positioning a second element in accordance with the simulated ground speed of said trainer; a driving disc rotated at a constant rate of speed; a second disc positioned with respect to said first-mentioned disc to be driven thereby; means for positioning one of said discs relative to the center of the other of said discs in accordance with the position of said second element, whereby the speed of rotation of said second-mentioned disc is dependent upon the position of said second-mentioned element; and means connecting said second disc and said first-mentioned element whereby said first-mentioned element is moved at a rate dependent upon the assumed ground speed of said trainer.

7. The combination of a grounded aviation trainer comprising a first element which it is desired to move at a rate of speed dependent upon the assumed ground speed of said trainer; means for positioning a second element in accordance with the simulated ground speed of said trainer; a driving disc rotated at a constant rate of speed; a second disc positioned with respect to said first-mentioned disc to be driven thereby; means for positioning one of said discs relative to the center of the other of said discs in accordance with the position of said second element, whereby the speed of rotation of said second-mentioned disc is dependent upon the position of said second-mentioned element; and a magneto-electric device, having its rotor coupled to said driven disc for rotation therewith, connected to means for driving said first element.

8. In a variable speed drive apparatus of the character described, a vertical drive disc, means connected to said drive disc for rotating it at constant speed, a driven wheel having its periphery constantly engaging the face of said drive disc, a magnetoelectric device having a rotor operatively coupled to said driven wheel, said device being bodily movable with said driven wheel, means supporting said driven wheel and said device for movement parallel to and radially of the face of said drive disc, means for rotating said supporting means about a vertical axis, and means for positively moving the driven wheel and magnetoelectric device supporting means radially of said drive disc, whereby the speed of rotation of said driven wheel and of the rotor of said device may be varied.

9. In a variable speed drive apparatus of the character described, a drive disc, driving means connected to said drive disc and adapted to rotate it at constant speed, a driven wheel having its periphery engaging the face of said drive disc, a carriage supporting said driven wheel for movement radially across the face of said drive disc, means associated with said carriage and constructed and arranged constantly to urge said driven wheel yieldingly against the face of said drive disc, a magnetoelectric device having a rotor and also supported by said carriage for movement radially of said drive disc with said driven wheel, means connecting the rotor of said device to said driven wheel, and means for moving said carriage to move said driven wheel radially across the face of said drive disc.

10. In a variable speed drive apparatus of the character described, a vertical drive disc, an electric motor geared to said drive disc and adapted to rotate it at constant speed, a driven wheel having its periphery engaging the face of said drive disc, a carriage supporting said driven wheel for movement radially across the face of said drive disc, means including a spring associated with said carriage and constructed and arranged constantly to urge said driven wheel yieldingly against the face of said drive disc, a magnetoelectric device having a rotor and also supported by said carriage for movement radially of said drive disc with said driven wheel, shaft means connecting the rotor of said device to said driven wheel, and means for moving said carriage to reciprocate said driven wheel.

11. A variable speed drive apparatus comprising in combination a vertical drive disc, a motor connected to said drive disc and adapted to rotate it at constant speed, a driven wheel having its periphery engaging the face of said drive disc, a rectangular rail extending parallel to the face of said drive disc, a carriage reciprocable along said rail and having guide rollers engaging the four sides of said rail, a vertical spindle carried by one end of said carriage, a housing member secured to the lower end of said spindle and rotatably supporting said driven wheel, a torsion spring connected to said carriage and said housing member and arranged to urge said housing member toward said drive disc, and a magnetoelectric device having a rotor and rigidly secured to and extending partially within an opening in said housing, said device being coupled through its rotor to said driven wheel.

12. A variable speed drive apparatus comprising in combination a vertical drive disc, an electric motor connected to said drive disc and adapted to rotate it at constant speed, a driven wheel having its periphery engaging the face of said drive disc, a rectangular rail extending parallel to the face of said drive disc, a carriage reciprocable along said rail and having guide rollers engaging the four sides of said rail, a vertical spindle carried by said carriage, a housing member secured to the lower end of said spindle and rotatably supporting said driven wheel, a torsion spring connected to said carriage and said housing member and arranged to urge said housing member toward said drive disc, a self-synchronous electric motor coupled to said driven wheel and rigidly secured to said housing, and means for moving said carriage to reciprocate said driven wheel and vary its speed of rotation, said means including a pinion, a reciprocable rack driven by said pinion, guiding means for producing straight line reciprocation of said rack, and a connecting rod secured at its opposite ends to said rack and said carriage.

GUNNE LOWKRANTZ.